US006416807B1

(12) United States Patent
Yamamoto

(10) Patent No.: US 6,416,807 B1
(45) Date of Patent: Jul. 9, 2002

(54) MIXED FINE POWDER FOR BEVERAGE CONTAINING YOUNG BARLEY LEAVES, ALFALFA AND/OR KALE

(76) Inventor: Yoshio Yamamoto, 14-71-905, Obase-cho, Tennoji-ku, Osaka-shi, Osaka (JP)

( * ) Notice: Subject to any disclaimer, the term of this patent is extended or adjusted under 35 U.S.C. 154(b) by 0 days.

(21) Appl. No.: 09/245,458

(22) Filed: Feb. 5, 1999

(30) Foreign Application Priority Data

Feb. 6, 1998 (JP) .............................................. 10-41230
May 28, 1998 (JP) ........................................... 10-166053

(51) Int. Cl.[7] .............................. A23F 3/00; A23F 3/32
(52) U.S. Cl. ........................ 426/597; 426/590; 426/285
(58) Field of Search ............................... 426/597, 590, 426/285

(56) References Cited

U.S. PATENT DOCUMENTS 5,744,187 A * 4/1998 Gaynor

OTHER PUBLICATIONS

Database Abstract for SU 1738216. Derwent Access No.: 1993–174356. Inventors: Dzneladze et al, Jun. 7, 1992.*
Database Abstract for GB 2196228. Derwent Access No.: 1988–114641. Inventor: Quick, Apr. 27, 1988.*
Database Abstract for JP 62036327 from file JPAB. Inventor: Niwa, Feb. 17, 1987.*
Database Abstract for JP 406100442 from file JPAB. Inventors: Fujii et al, Apr. 12, 1994.*
Database Abstract for JP 359006869 from file JPAB. Inventor: Hatsuzawa, Jan. 13, 1984.*
Database Abstract for JP 4800959. AN 73(10:H1551 FSTA. Inventor: Tanaka, 1973.*

* cited by examiner

Primary Examiner—Anthony J. Weier
(74) Attorney, Agent, or Firm—Koda & Androlia

(57) ABSTRACT

Mixed fine powder for beverage includes a first essential fine powder ingredient of young barley leaves, alfalfa and/or kale and a second essential fine powder ingredient of non- and/or, semi fermented tea. The mixed fine powder may further include a third additional fine powder ingredient of nutritious food materials such as striped bamboo, adlay, ginkgo leaves, turmeric, carrot, brown rice and the like. Beverages prepared with the mixed fine powder, which are full of nutriment, have almost no unpleasant bitterness or strong smell of barley leaves, alfalfa or kale and are pleasingly drinkable.

7 Claims, No Drawings

MIXED FINE POWDER FOR BEVERAGE CONTAINING YOUNG BARLEY LEAVES, ALFALFA AND/OR KALE

BACKGROUND OF THE INVENTION

1. Field of the Invention

The present invention relates to mixed fine powder for beverage containing young barley leaves, alfalfa and/or kale.

2. Prior Art

Tea, one of drinking preferences, is classified into non-fermented tea (e.g. green tea), semi-fermented tea (e.g. oolong tea) and fermented tea (e.g. black tea) according to methods used in leaf processing. Fermentation here means oxidation of components of tea leaves by enzyme in the fresh leaves, which has nothing to do with a microorganism. There are various types of non-fermented tea. For example, Sencha, the most common green tea in Japan; Gyokuro, the top grade of leaf tea made from the choicest, most tender leaves; Matcha, a powdered form of green tea used mainly in the tea ceremony and made from the choicest, most tender leaves; Kabusecha, a middle-grade tea between gyokuro and sencha; Bancha, yellowish brown, low-grade coarse tea made from older, brittle tea leaves; Gyokurokucha, more coarsely crushed into pieces than sencha; Hojicha, dark reddish brown tea made from sencha and bancha; and the like.

Tea leaves of the above non- and semi-fermented tea are rich in vitamins (e.g. vitamin A, $B_1$, $B_2$, C, E, niacin, folic acid, biotin), minerals (e.g. calcium, potassium, magnesium, iron, manganese, sodium) and tannins (e.g. catechin, flavonol, leucoanthocyanin, phenolcarboxylic acid).

Such non- or semi-fermented tea, except for matcha, is in general drunk by brewing tea leaves by steeping in hot water; in other words, resultant water with extract or exudate from tea leaves is drunk. Therefore, when we say drink tea, we only take into our body the extracted or discharged components into water from non- or semi-fermented tea and some nutritious components remain in the tea grounds. On the other hand, matcha is drunk in a different way by adding hot water into matcha powder and rapidly beating it with a bamboo whisk, and therefore substantially the whole tea leaves in a powdered form are taken into our body. Such a way of drinking matcha can be said an ideal efficient way of taking nutriment from tea leaves.

In addition to the above named types of non- and semi-fermented tea, various health-conscious types of tea such as dokudamicha (tea made from dokudami, Houttuynia cordata), habucha (tea made from roasted oriental senna seeds), and hatomugicha (tea made from adlay (hatomugi, Coix ma-yuen) have recently become popular. These types of tea are used as crushed material, brewed by steeping in hot or cold water, and resultant water containing the extracted and exuded tea nutriment is ingested. There is an attempt to use a powdered form of these materials by dissolving in hot or cold water so that the abundant nutriment of them can be efficiently taken into our body.

Mugicha, barley tea, is another type of tea, and usually drunk cooled, which Japanese people prefer especially in summer.

Mugicha is made from barley and rich in vitamin $B_1$. It is therefore preferably drunk as a source of vitamin $B_1$. It is typically brewed, like non-fermented tea as stated above, by steeping roasted barley in hot or cold water and resultant barley water containing extract or exudate from barley is drunk. There is a new trial to use a powdered form of young barley leaves just like matcha, dissolve it in water and drink resultant barley water, so that nutriment contained in barley, especially in young barley leaves, can be efficiently ingested.

There is another edible plant that recently draws public attention due to its abundance of vitamin like young barley leaves stated above, and further protein and mineral; it is alfalfa.

Alfalfa is eaten generally as its bean sprouts. There is a new way of eating by dissolving a powdered form of alfalfa in water and drinking resultant alfalfa water in order to facilitate efficient ingestion of rich nutriments in alfalfa.

There is further another edible plant that recently draws public attention; it is kale. Kale is used as raw material for healthy beverages such as healthy tea or green vegetable juice called aojiru.

Kale is an improved variety of cabbage. Vitamins U and C abounds in kale leaves as well as in cabbage. Kale leaves are usually eaten as a fresh vegetable, and also drunk as green vegetable juice aojiru prepared by squeezing leaves in order to fully take its rich nutriments. And there is an attempt to use a powdered form of kale just like matcha and take it as kale water by dissolving the powder in water.

However, the powder of young barley leaves and that of alfalfa have unpleasant high bitterness, and the powder of kale does unpleasant high bitterness and strong smell. Therefore, they are hard to drink by themselves. Beverages prepared with them by adding only water to the powder and rapidly beating with a whisk like matcha are not pleasingly accepted in general.

It is therefore an object of the present invention to provide mixed fine powder for beverage containing young barley leaves, alfalfa and/or kale which not only enables efficient ingestion of their rich nutriments but also gives agreeable flavor eliminating bitter taste and offensive smell.

With earnest study, the inventor found that it is possible to prepare beverages with favorable flavor by mixing fine powder of young barley leaves, alfalfa and/or kale with fine powder of non- and/or semi-fermented tea as essential ingredients.

The above and other objects, features and advantages of the present invention will become apparent from the following description.

SUMMARY OF THE INVENTION

Mixed fine powder for beverage containing young barley leaves, alfalfa and/or kale of the present invention includes a first ingredient in a powdered form of young barley leaves, alfalfa and/or kale and a second ingredient in a powdered form of non- and/or semi-fermented tea.

In addition to the first and second essential ingredients, at least one material selected from the group consisting of the following in a fine powdered form may be added; striped bamboo, adlay, ginkgo leaves, persimmon leaves, turmeric, ashitaba, licorice, oriental senna, matrimony vine, tochu leaves, rooibos leaves, rafuma leaves, gincha leaves, molokhiya, carrot, broccoli, celery, mandarin orange, wheat, soybean, embryo bud, brown rice, eggshell and chlorophyll.

The present invention may be carried out in a form of beverage in which the mixed fine powder of the present invention is dissolved in water and also in a form of tablet containing the mixed fine powder of the present invention.

PREFERRED EMBODIMENTS OF THE INVENTION

Mixed fine powder for beverage containing young barley leaves, alfalfa and/or kale of the present invention includes a first essential ingredient in a powdered form of at least one of young barley leaves, alfalfa and kale and a second essential ingredient in a powdered form of at least one of non- and semi-fermented tea.

Barley (*Hordeum vulgare*) is a gramineous biennial plant. It is grouped, according to shapes of spike, into a six-rowed type (*Hordeum vulgare L.*) and a two-rowed type (*H. distichum L.*), and a kind whose matured grains closely contact with their glumes is referred to as hulled barley and a kind whose grains easily separate from their glumes is to as naked barley. Two-rowed hulled barley is commonly called as beer barley. In addition to beer barley, six-rowed barley and naked barley are mainly grown in Japan.

Not only the above three kinds of barley but also other kinds of barley may be used suitably for the present invention. Six-rowed barley and naked barley, which are in general used for mugicha stated above, are more preferable.

Young barley leaves, especially prior to fruition, may be preferably used. Since young barley leaves are particularly rich in vitamin $B_1$, ingestion thereof enables supplementation of vitamin $B_1$. Using the leaves in a finely powdered form enables efficient ingestion of the entire barley nutriments such as vitamin $B_1$ without any waste.

Alfalfa (*Medicago sativa L.*) is a leguminous perennial grass and, in Japan, has been cultivated mainly in Hokkaido in the north part of Japan. Due to its abundance in vitamin, protein and mineral, it is regarded as one of valuable livestock feed. Alfalfa in a powdered form is very preferable in terms of digestion and absorption, and preferably used as livestock feed. Bean sprouts of alfalfa are well known as preferable food plant due to their main components of fibers and vitamins which are said good for the human body.

Alfalfa is rich in vitamins, proteins and minerals as stated above, and ingesting thereof enables supplementation of these nutriments. Using them in a powdered form facilitates efficient ingestion of the entire nutriments present in alfalfa without waste.

In the present invention, the entire part of alfalfa can be used, and young (especially 2 or 3 year-old) alfalfa is very much preferable, because, 4 or 5 years after seeding, it becomes lacking in nutritious juice and vulnerable to damage caused by blight or other plant diseases. Each part of alfalfa, i.e. stems, leaves, flowers and others, may be used individually or in a mixture of any of them.

Kale (*Brassica oleracea L.var.acephala*) is a perennial plant falling under a brassicaceous brassica and grows wild in the coasts of European countries. It is an improved variety of cabbage, now cultivated in Greece and Rome and its leaves are often eaten. In Japan kale is usually regarded as a decorative plant and also used as livestock feed. Since its leaves are rich in vitamins C and U, and good for preventing gastritis, gastric ulcer or constipation and improving hepatic functions, it is recently used as material for green vegetable juice aojiru.

In the present invention, young barley leaves, alfalfa and/or kale may be used individually or in a mixture of any of them. In case of a mixture, respective nutriments of them can be ingested simultaneously. In either case of individual or mixed use thereof, fine powder of non- and/or semi-fermented tea described below is further added as a second essential ingredient. With this second ingredient, bitterness of young barley leaves and alfalfa or bitterness and unpleasant smell of kale are weakened, and thereby resulting in providing easily drinkable, agreeable beverages with which nutriments of the non- and/or semi-fermented tea can be simultaneously ingested. Especially kale itself is very poor in palatability due to its strong unpleasant smell, but mixing it with fine powder of non- and/or semi-fermented tea allows to prepare agreeable beverages with kale.

In the present invention, the second essential ingredient, tea, is added to the first essential ingredient i.e. young barley leaves, alfalfa and/or kale, and among various types of tea, non-fermented tea and/or semi-fermented tea is used.

As stated above, tea can be classified according to methods used in leaf processing into three types; i.e. non-fermented tea, semi-fermented tea and fermented tea. Green tea is one of non-fermented tea, which is produced by inactivating oxidase (polyphenol oxidase) present in leaves of tea (*Thae sinensis*) by heating; black tea is one of fermented tea, which is produced by sufficiently utilizing the enzymatic effect by not heating throughout the entire process; and oolong tea is one of semi-fermented tea, which is produced by an intermediate method between those for the non-fermented and the fermented tea. Non-fermented tea is further subdivided according to heating methods into steamed tea, which is green tea produced by inactivating enzyme by a steam heat treatment, and oven-roasted tea, which is green tea produced by inactivating enzyme by oven roasting.

In the present invention, it is preferable to use any one or more kinds of tea selected from the group consisting of steamed tea (non-fermented tea), such as sencha, gyokuro, matcha, bancha, hojicha, kabusecha, gyokurokucha, ryokudancha, oven-roasted tea (non-fermented tea), such as aoyagicha, ureshinocha, chinese green tea, and also semi-fermented tea such as oolong tea.

The total amount of non- and/or semi-fermented tea within mixed fine powder of the present invention is not especially limited, but it is preferably to have 0.3 to 8 times of the fine powder of young barley leaves, alfalfa, kale, if individual, or a mixture of any of them. An amount of tea less than 0.3 times of them cannot sufficiently weaken the unpleasant bitterness and/or strong smell of young barley leaves, alfalfa and/or kale, and resulting in poor palatability. On the other hand an amount of tea exceeding 8 times of them cannot provide sufficient effects of nutrition of young barley leaves, alfalfa and/or kale. Either case is not preferable for the present invention.

Mixed fine powder for beverage containing, as a first essential ingredient, fine powder of young barley leaves, alfalfa and/or kale and, as a second essential ingredient, fine powder of non- and/or semi-fermented tea may further include any one or more fine powdered forms of striped bamboo, adlay, ginkgo leaves, persimmon leaves, turmeric, ashitaba, licorice, oriental senna, kuko, tochu leaves, rooibos leaves, rafuma leaves, gincha leaves, molokhiya, carrot, broccoli, celery, soybean, mandarin, wheat, embryo bud, unmilled brown rice, eggshell, chlorophyll.

Striped bamboo, adlay, ginkgo, persimmon (kaki), turmeric, ashitaba, licorice, oriental senna, kuko, tochu rooibos, rafuma are medicinal herbs and plants known as materials for healthful tea beverages. Since they are known to have following medicinal qualities to be stated below, adding any of them to the above essential ingredients of the present invention gives the beverages various healing qualities and enhances improvement of health.

Striped bamboo (*Sasa veitchii*) is a gramineous plant which grows wild in most parts of Japan except in the north part thereof (i.e. Honshu, Chugoku and Kyushu districts) and cultivated in gardens as a decorative plant. Stalks and leaves of striped bamboo contain triterpenes which has refreshing, antipyretic, quenching and diuretic properties, and therefore it is advisable to use stalks and leaves of striped bamboo.

Adley (hatomugi, *Coix lachryma-jobi L.*) is a gramineous annual plant which grows in the tropic Asian countries such as India, Malaya and the south part of China.

Adley has lots of potassium and improves body metabolism. It is, therefore, good for rough skins and spots, and thus expected as a useful plant with good skin care properties. It is also effective in preventing hypertension, neuralgia and in recovery from fatigue and the like.

Ginkgo (*ginkgo biloba L.*) is a ginkgoaceous defoliation arbor tree, and in the present invention its leaves are used. Ginkgo leaves include flavonoids, and the use of ginkgo leaves enables prevention of arteriosclerosis. Subsequently, it is effective against aging with arteriosclerosis.

Persimmon (*Diospyros kaki L.*) is an ebenaceous fruit tree and its leaves have been long used as a chinese herb medicine against a hypertension symptom. Persimmon leaves are rich with vitamin C and good for protection from a cold. They are also rich with tannin and effective in preventing hypertension and arteriosclerosis.

Turmeric (*Curcuma domestica*) is a zingiberaceous perennial plant. It is cultivated in the southern parts of Japan (i.e. south Kyushu and Okinawa), and its rhizomes are used as raw material of turmeric tea, ukoncha. Rhizomes of turmeric are preferably effective for the treatment for diseases of adults, and also known to have a liver healing property. Therefore, addition of turmeric into the fine powder of the present invention provides an effect of a liver healing medicine. Any part of turmeric plant can be used unlimitedly, but it is most preferable to use rhizomes which are used as material of ukoncha and rich with medicinal components.

Ashitaba (*Angelica keiskei*) is an umbelliferous perennial plant, and in Japan cultivated in the central part of Japan (e.g. the middle part of Honshu and in the Pacific coastal areas of the Kantor district). Ashitaba is abundant with flavonoid, vitamin $B_2$ and iron, and effective against arteriosclerosis, constipation and anemia. Any part of this plant can be used, and all of the parts such as leaves, stems, rhizomes, and fruits may be usable.

Licorice (*Glycyrrhiza glabra*) is a leguminous plant native to China, and its rhizomes are used as raw material for licorice tea, kansocha. Rhizomes of licorice are rich with glucuronic acid and effective against gastric ulcer and gastritis. Any part of licorice plant can be used, but its rhizomes which are used as material of kansocha and contain medicinal components are most preferable.

Oriental senna (*Cassia occidentalis L.*) is a leguminous annual plant and tea prepared with its seeds are called as habucha. Seeds of oriental senna contain anthraquinones such as fustion and chrysophanol and the like which are effective against constipation, liver troubles, hypertension and the like. Not only the seeds but also the leaves of senna which also include the above effective components can be employed in the present invention.

Matrimony vine, kuto (*Lycium chinense*), is a solanaceous defoliation shrub and its leaves are used for matrimony vine tea, kukoc,ha. Since kuko leaves are rich in vitamins $B_1$, $B_2$, C, essential amino acids, potassium and phosphorus and the like, they have an effective recovering quality from fatigue. They are also effective against hypertension, arteriosclerosis, constipation and the like. Seeds and roots of kuko may also be usable, and the seeds are more preferable for giving nutriments and improving robustness.

Tochu (*Eucommiaceae ulmoides*) is a eucommiacous defoliation tree, and its bark has been long used as a crude drug in China. Tochucha, tea made from tochu leaves, has recently become popular in Japan. In the present invention, tochu leaves are used. Tochu leaves contain components similar to those in the bark, and are effective in reducing a blood pressure, preventing obesity and getting rid of stress.

Rooibos (*Aspalathus linears*) is a leguminous plant native to the southern part of Africa, and rooibos tea made from rooibos leaves has been long drunk in that area as medicinal tea. In the present invention, rooibos leaves are used. It was recently found that rooibos tea is preferably effective against atopic dermatitis.

Rafuma (*Apocynum venetum L.*) is an apocynaceous perennial herbage, and mainly grows in sandy soil or green-grassed swamp in the northwest, northern, eastern and northeastern districts in China. Semi-fermented leaves of rafuma is known as rafumacha (rafuma tea), and in the present invention such semi-fermented leaves is used. Rafuma leaves are rich with calcium, iron, SOD (superoxide inactivating effect), magnesium and the like, and it was found that they have analgesic and strengthening properties.

There is another kind of tea shrub, gincha. Tea made from gincha has a resemblance to rafumacha and is known as one kind of healthful tea. Gincha is also usable in the present invention. Gincha is mainly grown in Okinawa, Japan and rich in minerals such as calcium and iron as well as vitamins such as vitamins A, C, E and the like.

Mixed fine powder for beverage of the present invention which includes fine powder of young barley leaves, alfalfa and/or kale and that of non- and/or semi-fermented tea as essential ingredients may include additional ingredient having high nutriments. Examples having a high nutritive value includes molokhiya, carrot, broccoli, celery, soybean, mandarin orange, wheat and the like. The additional ingredient enriches the mixed fine powder of the present invention and kills the unpleasant bitterness of young barley leaves and alfalfa and also the unpleasant bitterness and strong smell of kale. When barley, alfalfa, or kale is not used in the invented fine powder as an essential ingredient, any of them may be added as an additional ingredient, not as an essential ingredient, due to their high nutritive value.

Molokhiya (*Corchorus Scapsularis L.*) is a tiliaceous annual plant and one of yellow-green vegetables cultivated in Arabian tropical countries, mainly in Egypt. Molokhiya is rich with various minerals such as calcium, vitamins such as vitamins $B_1$ and $B_2$ and carotene.

Broccoli (*Brassica oleracea L.*) is a brassicaceous annual or biennial plant and rich with vitamins such as vitamin K, protein and iron.

Carrot (*Daucus carota L.*) is an umbelliferous annual or biennial plant and its root is usually eaten. The root is very rich with carotinoids and therefore regarded as a typical source of carotene. In the present invention, not only roots but also leaves are preferably used. Addition of carrot means enriching the invented mixed powder with carotene.

Celery (*Apium graveolens L.*) is also an umbelliferous annual or biennial plant and rich with vitamins and can be used for fortifying the invented mixed power with vitamins.

Soybean (*Glycine hispida Max.*) is a leguminous plant native to China, and abundant in proteins, fats and carbohydrates. By adding soybean, the overall nutritive value of the invented mixed powder can be enhanced.

Mandarin is a citrus fruit. In the present invention, a type of mandarin which is easily peeled, especially satsuma mandarin (*C. unshiu Mar.*), is preferable. And the peel, string, and inner thin skin (skin of each segment) of mandarin are used in a fine powdered form. They contain vitamin C and hesperidin. The inner skin and string of mandarin respectively has about 50 and 300 times of hesperidin as the fruit flesh does. Hesperidin suppresses the increase in the blood pressure, strengthens a blood vessel, and stabilize vitamin C which is unstable in its nature. In addition, mandarin contains a larger amount of β-cryptoxanthin, citric acid, pectin and the like than other fruits. β-cryptoxanthin protects normal cells from carcinogenic substance or active oxygen, and thereby suppress cancer. Citric acid prevents the oxidation of blood, heightens the pH of blood, reduces the viscosity of blood, promotes the absorption of nutriments, and increases resistance. Pectin is effective against constipation.

Wheat (*Triticum aestivum*) is a gramineous plant. It has been long cultivated as one of the most important edible plants all over the world, and mostly consumed as milled flour. The main component of flour is starch and flour is useful as a calorific source. Wheat also includes a relatively large amount of protein so that mixing flour with the fine powder of the present invention enriches nutriments thereof.

Furthermore, in the present invention, embryo buds, unmilled rice (brown rice), eggshells and chlorophyll may additionally mixed into the invented fine powder.

Embryo buds are rich in vitamins such as vitamin $B_1$ and minerals. Unmilled rice (brown rice), which has not been fully polished and lost only a smaller amount of nutriments, is rich in fats, proteins, minerals, vitamins $B_1$ and $B_{12}$ and is useful as a source of various nutriments. Eggshells, 93% of which is calcium carbonate, are a preferable source of calcium. Chlorophyll is effective against ulcer, and has an effect of killing unpleasant smell.

In the present invention, the plants and other food materials described above are used as an additional ingredient in a fine powdered form. Optional selection therefrom and mixture into the invented powder enable effective ingestion of respective nutriments present within respective materials. Resultant mixed powder is readily soluble in hot or cold water and can be prepared into an agreeable beverage.

There are no particular limitation in the amounts of respective additional powdered materials stated above to be mixed into the invented powder, but it is preferable that the amount thereof is 10% by weight or less of the total weight including the fine powder of young barley leaves, alfalfa and/or kale (the first ingredient) and that of non-and/or semi-fermented tea (the second ingredient). Mixture of these additional materials exceeding 10% by weight is not advisable because it ends up with insufficient nutritive effect of young barley leaves, alfalfa and/or kale and killing unique pleasing aroma of the non- and/or semi-fermented tea.

A beverage can be prepared by dissolving blended fine powder for beverage including the first and second essential powder ingredients or the powder including these essential ingredients and additional ingredient of one or more of various food materials listed above, such as adlay and ginkgo leaves, into hot or cold water. Thus prepared beverage has rich nutriments contained in young barley leaves, alfalfa and/or kale, but does not have unpleasant bitterness and strong smell thereof, therefore this beverage is preferable in palatability as well as nutritiousness. Furthermore process of the invented fine powder into tablets enables easy ingestion thereof.

EXAMPLES

Mixed fine powder for beverage including young barley leaves, alfalfa and/or kale according to the present invention is further described below showing preferable examples and comparative examples. However, nothing therefrom is meant to be restrictive in any way with respect to the present invention.

Ingredients included in the mixed fine powder in the preferable examples 1 to 17 and the comparative examples 1 to 5 are shown in the following table 1. Each of the ingredient was used in a fine powdered form. Furthermore matcha was used as a reference example.

About 2 g of each powder (of a single ingredient or mixed ingredients) shown in the table was put in a bowl, about 50 cc of hot water was poured thereinto and stirred to prepare beverages of the preferable examples 1 to 17 including young barley leaves, alfalfa and/or kale according to the present invention, the comparative example 1 to 5 and the reference example. Thus prepared beverages were respectively tested by 10 persons by means of scores based on the following criteria and then respective mean values were calculated.

Test Criteria could easily and pleasingly drink . . . 4 points could drink without problem . . . 3 points could drink but there were a slight unpleasant bitterness and strong smell . . . 2 points could not drink due to unpleasant bitterness and strong smell . . . 1 point The results are shown in the right column in Table 1.

TABLE 1

| | Preferable examples of the present invention | | | | | | |
|---|---|---|---|---|---|---|---|
| examples | 1st essential ingredient/g | | 2nd essential ingredient/g | | additional ingredient/g | | score |
| 1. | barley | 5 | sencha | 5 | — | | 3.6 |
| 2. | alfalfa | 5 | sencha | 5 | — | 3.5 | |
| 3. | barley alfalfa | 3.3 3.3 | gyokuro | 3.4 | — | 3.4 | |
| 4. | barley | 4.9 | gyokuro | 4.9 | adlay | 0.2 | 3.9 |
| 5. | alfalfa | 4.9 | bancha | 4.9 | gingko molokhiya | 0.1 0.1 | 3.8 |
| 6. | barley alfalfa | 3.3 3.3 | bancha | 3.3 | brown rice | 0.1 | 3.7 |
| 7. | barley alfalfa | 3.2 3.2 | sencha | 3.2 | turmeric o. senna carrot chlorophyll | 0.1 0.1 0.1 0.1 | 3.9 |
| 8. | barley alfalfa | 3.2 3.2 | sencha | 3.2 | licorice kuko celery soybean | 0.1 0.1 0.1 0.1 | 3.9 |
| 9. | barley alfalfa | 3.2 3.2 | oolong tea | 3.2 | persimmon o. senna rooibos broccoli | 0.1 0.1 0.1 0.1 | 3.9 |
| 10. | barley alfalfa | 3.2 3.2 | sencha oolong tea | 1.6 1.6 | tochu rafuma gincha embryo buds | 0.1 0.1 0.1 0.1 | 3.9 |
| 11. | kale | 5 | sencha | 5 | — | | 3.5 |
| 12. | kale | 5 | sencha oolong tea | 2.5 2.5 | — | | 3.6 |
| 13. | kale | 4.8 | sencha | 4.8 | striped bamboo | 0.4 | 3.8 |
| 14. | kale | 4.8 | sencha oolong tea | 2.4 2.4 | brown rice | 0.4 | 3.8 |
| 15. | kale | 4.8 | gyokuro | 4.8 | embryo buds ashitaba | 0.2 0.2 | 3.9 |
| 16. | kale | 4.7 | sencha | 4.7 | soybean licorice celery | 0.2 0.2 0.2 | 3.9 |
| 17. | kale | 4.6 | gyokuro | 4.6 | kuko carrot | 0.2 0.2 | 3.9 |

TABLE 1-continued

|  |  |  |  |
|---|---|---|---|
|  |  | molokhyia | 0.2 |
|  |  | eggshells | 0.2 |

| Comparative and reference examples | | | |
|---|---|---|---|
| examples | ingredient(s)/g | | score |
| 1. | young barley leaves | | 1.6 |
| 2. | alfalfa (entire plant) | | 1.5 |
| 3. | young barley leaves | 5 | 1.4 |
|  | alfalfa (entire plant) | 5 |  |
| 4. | Kale | | 1.5 |
| 5. | kale | 5 | 1.5 |
|  | striped bamboo | 0.5 |  |
| reference | matcha | | 3.8 |

[Notes]
barley . . . young barley leaves prior to fruition
alfalfa . . . whole plant
ginkgo, kuko, persimmon, rooibos, tochu, rufuma . . . leaves
turmeric, licorice . . . rhizomes
o. senna (oriental senna) . . . seeds From the results shown in Table 1, beverages including fine powder of young barley leaves, alfalfa and/or kale as a first essential ingredient and fine powder of non- and/or semi-fermented tea as a second essential had much less unpleasant bitterness and smell compared with beverages including only essential fine powder of young barley leaves, alfalfa or kale. The beverages with invented blended powder could be drunk pleasingly. Furthermore it is apparent that the additional ingredient, which enriches the beverages with various nutriments, helped reduce unpleasant bitterness and kill strong smell and thereby more agreeable beverages were provided.

As detailed above, since the present invention provides blended fine powder for beverage including fine powder of young barley leaves, alfalfa and/or kale and that of non- and/or semi-fermented tea, the invention enables effective ingestion of nutriments present in young barley leaves, alfalfa and/or kale, and preparation of highly agreeable beverages with almost no unpleasant bitterness and strong smell.

The present invention further includes an additional powdered ingredient of at least one or more materials selected from the group consisting of striped bamboo, adlay, ginkgo leaves, persimmon leaves, turmeric, ashitaba, licorice, oriental senna, kuko, tochu leaves, rooibos leaves, rafuma leaves, gincha leaves, molokhiya, carrot, broccoli, celery, soybean, mandarin, wheat, embryo buds, eggshells, brown rice and chlorophyll. With thus mixed powder, it is possible to effectively ingest respective nutriments therefrom. As a result, the invented mixed powder has a variety of medicinal qualities and can be a preferable source of various nutriments.

What is claimed is:

1. A mixed fine powder for beverage consisting essentially of a first essential ingredient in a fine powdered form of at least one selected from the group consisting of young barley leaves, alfalfa and kale and a second essential ingredient in a fine powdered form of at least one selected from the group consisting of non- and semi fermented tea.

2. A mixed fine powder for beverage consisting essentially of a first essential ingredient in a fine powdered form of at least one selected from the group consisting of young barley leaves, alfalfa and kale, a second essential ingredient in a fine powdered form of at least one selected from the group consisting of non- and semi fermented tea and a third ingredient in a fine powdered form of at least one material selected from the group consisting of striped bamboo, adlay, ginkgo leaves, persimmon leaves, turmeric, ashitaba, licorice, oriental senna, kuko, tochu leaves, rooibos leaves, rafuma leaves, gincha leaves, molokhiya, carrot, broccoli, celery, soybean, mandarin, wheat, embryo buds, eggshells, brown rice and chlorophyll.

3. Mixed fine powder according to claim 2 wherein an amount of the third ingredient is 10% by weight or less of total weight including the first and second ingredients.

4. A beverage wherein mixed fine powder consisting essentially of a first essential powder ingredient of at least one selected from the group consisting of young barley leaves, alfalfa and kale and a second essential powder ingredient of at least one selected from the group consisting of non- and semi fermented tea is dissolved in water.

5. A beverage wherein mixed fine powder consisting essentially of a first essential powder ingredient of at least one selected from the group consisting of young barley leaves, alfalfa and kale, a second essential powder ingredient of at least one selected from the group consisting of non- and semi fermented tea and a third powder ingredient of at least one material selected from the group consisting of striped bamboo, adlay, ginkgo leaves, persimmon leaves, turmeric, ashitaba, licorice, oriental senna, kuko, tochu leaves, rooibos leaves, rafuma leaves, gincha leaves, molokhiya, carrot, broccoli, celery, soybean, mandarin, wheat, embryo buds, eggshells, brown rice and chlorophyll is dissolved in water.

6. A tablet processed with mixed fine powder consisting essentially of a first essential powder ingredient of at least one selected from the group consisting of young barley leaves, alfalfa and kale and a second powder essential ingredient of at least one selected from the group consisting of non- and semi fermented tea.

7. A tablet process with mixed fine powder consisting essentially of a first essential powder ingredient of at least one selected from the group consisting of young barley leaves, alfalfa and kale, a second essential powder ingredient of at least one selected from the group consisting of non- and semi fermented tea and a third powder ingredient of at least one material selected from the group consisting of striped bamboo, adlay, ginkgo leaves, persimmon leaves, turmeric, ashitaba, licorice, oriental senna, kuko, tochu leaves, rooibos leaves, rafuma leaves, gincha leaves, molokhiya, carrot, broccoli, celery, soybean, mandarin wheat, embryo buds, eggshells, brown rice and chlorophyll.

* * * * *